April 10, 1951  R. W. SWANK  2,548,568
WATER SEPARATOR
Filed Dec. 29, 1944

INVENTOR.
Ralph W Swank
BY Ralph Hammer
Attorney

Patented Apr. 10, 1951

2,548,568

UNITED STATES PATENT OFFICE 2,548,568

WATER SEPARATOR

Rehl W. Swank, Edinboro, Pa., assignor to Erie Meter Systems, Inc., Erie, Pa., a corporation of Pennsylvania Application December 29, 1944, Serial No. 570,445

3 Claims. (Cl. 210—43)

In the dispensing of gasoline there is need for a water separator or dehydrator which will remove or separate water whether dispersed throughout the gasoline or in the form of slugs. This invention is a compact arrangement for accomplishing this result. Further objects and advantages appear in the specification and claims.

Figure 1:
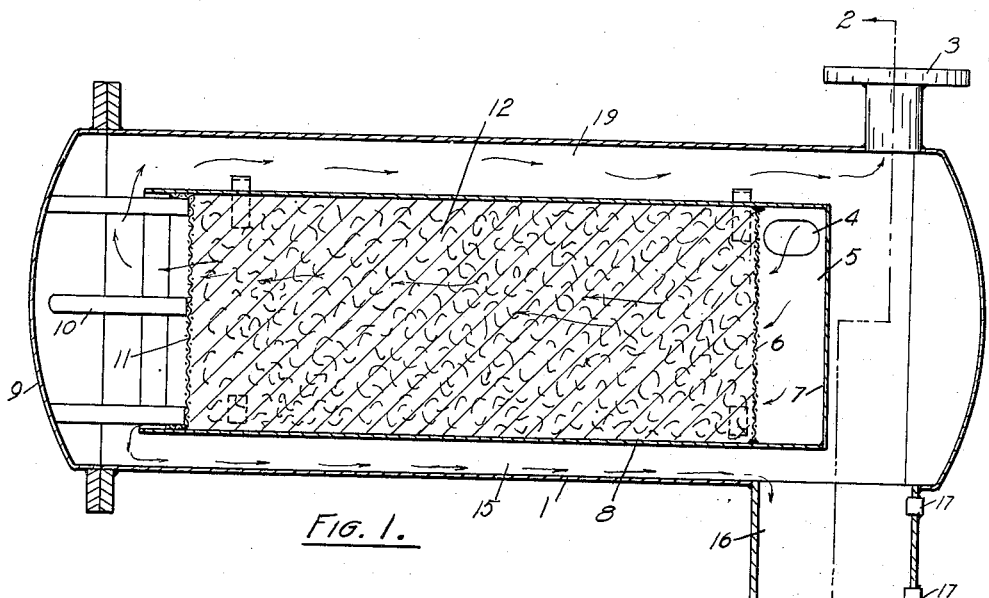
Figure 2:
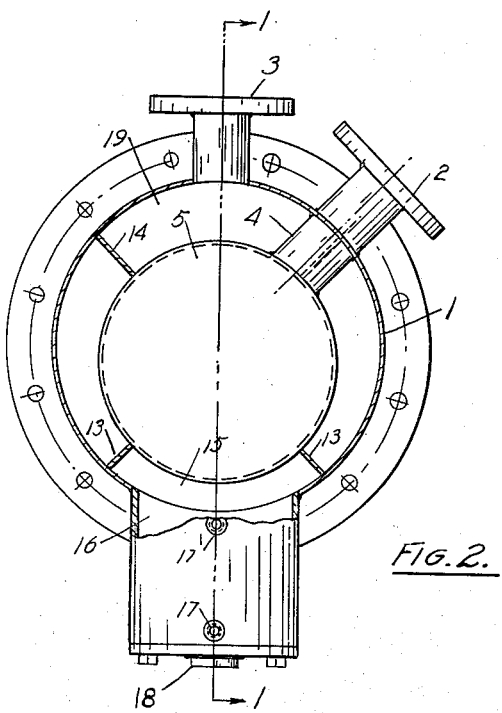

In the accompanying drawing, Fig. 1 is a sectional side elevation of a water separator, and Fig. 2 is an end view partly broken away.

Referring to the drawing, there is shown a tank 1 having inlet and outlet fittings 2 and 3 for connection in a gasoline line. The outlet fitting 3 is located in the top wall of the tank adjacent one end. The inlet fitting is located at the same end of the tank and is connected through a tube 4 to a header 5 formed between a screen 6 and an end wall 7 closing one end of a tubular separator chamber 8. The purpose of the header is to distribute the flow of gasoline over the screen. The opposite end of the separator chamber is open and terminates short of a head 9 closing the other end of the tank.

On the head 9 are supports 10 carrying a screen 11 which fits within the open end of the separator chamber. The space between the screens 6 and 11 is packed with a separating medium 12, such as excelsior, which has the property of depositing the moisture dispersed in the gasoline. The gasoline flows through the excelsior at a relatively slow rate of speed due to the large cross section of the separating chamber. While passing through the excelsior the moisture in the gasoline collects in progressively larger drops which, being heavier than the gasoline, are deposited on the bottom wall of the separator chamber and drained to the bottom of the tank through the open end. The separator chamber is supported within the tank by spaced supports 13 and 14, the supports 13 being shorter than the supports 14 so that the separator chamber is nearer the bottom of the tank.

The water deposited from the gasoline drains through a passage 15 to a sump 16 directly below the inlet and outlet fittings. The sump is provided with fittings 17 for receiving a gauge glass and with a drain plug 18 for removing the accumulated water. The gasoline flows to the outlet through a passage 19 between the separator chamber and the top of the tank. Because the separator chamber is physically between the passages 15 and 19, there is little likelihood of water being picked up in the gasoline flowing to the outlet fitting. By this design the overall length of the separator unit can be decreased. Another advantage of this unit is that the gasoline inlet and outlet fittings and the water sump are conveniently located at one end of the tank.

Where the separator is installed in a pit, the opposite end of the tank can be buried and the size of the pit decreased because only the inlet and outlet fittings and the sump need be exposed.

What I claim as new is:

1. A water separator comprising a horizontal tank having at one end a sump and inlet and outlet fittings for connection in a gasoline line, an inner separator chamber within and spaced from the side walls of the tank and having a header closing one end and connected to the inlet fitting and its other end open and presented to and spaced from the opposite end of the tank, a water separating medium in the chamber, and a drain passage from the separator chamber to the sump.

2. A water separator comprising a horizontal tank having at one end a sump and inlet and outlet fittings for connection in a gasoline line, a horizontal separating chamber connected to the inlet fitting and discharging to the opposite end of the tank, the chamber having walls within and spaced from the tank and extending from said one end toward the opposite end of the tank to provide a drain passage to the sump between the separating chamber and the bottom of the tank and a passage to the outlet fitting between the separating chamber and the top of the tank, a water separating means in the chamber and a screen in the separating chamber for retaining a separating medium.

3. A water separator comprising a horizontal tank having at one end a sump and inlet and outlet fittings for connection in a gasoline line, a horizontal separating chamber having its inlet connected to the inlet fitting and its outlet at the opposite end of the tank, a water separating means in the chamber, the chamber having walls within the tank extending from said one end toward the opposite end and spaced from the tank to provide passages leading from the separating chamber outlet along the bottom of the tank to the sump and along the top of the tank to the outlet fitting, the passage to the outlet fitting being of greater area than the passage to the sump.

REHL W. SWANK.

REFERENCES CITED

The following references are of record in the file of this patent:

UNITED STATES PATENTS

| Number | Name | Date |
| --- | --- | --- |
| 136,364 | Conger | Mar. 4, 1873 |
| 439,695 | See | Nov. 4, 1890 |
| 631,371 | Kithcart et al. | Aug. 22, 1899 |
| 975,262 | Linn | Nov. 8, 1910 |
| 1,133,289 | Keithline | Mar. 30, 1915 |
| 1,430,234 | Keithline | Sept. 26, 1922 |
| 1,780,663 | Winslow et al. | Nov. 4, 1930 |
| 1,804,743 | Cannon | May 12, 1931 |
| 2,233,093 | Carman et al. | Feb. 25, 1941 |
| 2,345,848 | Winslow et al. | Apr. 4, 1944 |
| 2,348,925 | Reichhelm | May 16, 1944 |
| 2,363,009 | Lewis | Nov. 21, 1944 |

FOREIGN PATENTS

| Number | Country | Date |
| --- | --- | --- |
| 389,579 | France | July 3, 1908 |